United States Patent [19]

Youngs

[11] 4,166,446

[45] Sep. 4, 1979

[54] SOLAR COLLECTOR

[75] Inventor: John A. Youngs, Klingnau, Switzerland

[73] Assignee: BBC Brown Boveri & Company Limited, Baden, Switzerland

[21] Appl. No.: 838,302

[22] Filed: Sep. 30, 1977

[30] Foreign Application Priority Data

Dec. 3, 1976 [CH] Switzerland ............... 15239/76

[51] Int. Cl.² .................. F24J 3/02; G02B 5/10
[52] U.S. Cl. ........................ 126/438; 350/295
[58] Field of Search ............. 126/270, 271; 350/288, 350/292, 294, 295; 60/641; 362/297, 302, 346

[56] References Cited

U.S. PATENT DOCUMENTS

| | | | |
|---|---|---|---|
| 1,683,266 | 9/1928 | Shipman | 126/271 |
| 2,688,922 | 9/1954 | Bonaventura et al. | 60/641 |
| 2,806,135 | 9/1957 | Bolsey | 362/346 |
| 3,703,635 | 11/1962 | Burkarth | 362/346 X |
| 3,893,755 | 7/1975 | Cobarg et al. | 350/295 |
| 3,972,600 | 8/1976 | Cobarg et al. | 350/395 |
| 4,011,855 | 3/1977 | Eshelman | 126/271 |
| 4,027,653 | 6/1977 | Meckler | 126/271 |
| 4,033,676 | 7/1977 | Brantley, Jr. et al. | 350/295 |
| 4,050,444 | 9/1977 | Dolamore | 126/271 |

FOREIGN PATENT DOCUMENTS 486189   1/1976   U.S.S.R. ............... 126/270

*Primary Examiner*—William F. O'Dea
*Assistant Examiner*—Larry Jones
*Attorney, Agent, or Firm*—Werner W. Kleeman

[57] ABSTRACT

A solar collector comprising liquid-containing elements and a reflector. The reflector comprises overlapping plates which can be shifted into a first extended position imparting an approximately semicylindrical shape to the reflector and into a second collapsible position. The liquid-containing elements comprise a collector pipe or conduit enclosed by a protective tube. Radial elements extend in the longitudinal direction of the collector pipe and are attached thereto. The liquid-containing elements are rotatably mounted on the collector pipe.

5 Claims, 2 Drawing Figures

SOLAR COLLECTOR

BACKGROUND OF THE INVENTION

The present invention relates to a new and improved construction of a solar collector of the type comprising liquid-containing elements and a reflector.

The heretofore known solar collectors can be generally divided into two different types, namely flat collectors and so-called focusing collectors. In the case of the flat collectors, a container through which there is guided a liquid is covered with a radiation-absorbing surface, predominantly a black surface, and which surface upon being irradiated by solar energy heats-up and transfers its heat to the liquid. The heated-up liquid either is transmitted directly to the point of consumption or delivered to a storage tank or other suitable storage. In order to reduce the heat losses of the collector the latter is provided at its rear surface with an insulating layer, and in order to decrease convective cooling the front surface is covered with a glass plate or a plastic plate. The radiation losses from the cover plate are reduced by means of a special coating which readily adsorbs the radiation in the spectrum of sunlight, but hardly radiates energy in the thermal band.

In contrast to a flat collector, in the case of a focusing collector, the incident solar radiation is concentrated at a small area before being absorbed. Therefore, for the same performance there is required a much smaller area, also resulting in lower heat losses and rendering possible correspondingly higher temperatures (see the publication "Solar Energy and Building" by S.V. Szokolay).

Solar collectors are usually situated on the roofs of buildings or other structures. Since a roof only has a limited area which can be used for placement of the solar collectors, difficulties arise with regard to the capacity of the solar collectors.

It has already been proposed to incorporate solar collectors into sunblinds, so that, apart from shielding the interior from solar irradiation, it is possible at the same time to employ the radiation for heating the liquid in the collectors (see part 3 of the above-cited publication).

Yet, with this arrangement difficulties arise insafar as the state-of-the-art solar collectors are relatively heavy and cannot be collapsed or folded.

SUMMARY OF THE INVENTION

Hence, with the foregoing in mind, it is a primary object of the present invention to provide a new and improved construction of solar collector which is not associated with the aforementioned drawbacks and limitations of the prior art proposals.

Another and more specific object of the present invention aims at the provision of a new and improved construction of a solar collector which can be easily incorporated into sunblinds or equivalent structure, and furthermore, requires very little space and can be connected in a most simple manner.

Yet a further significant object of the present invention aims at a novel construction of solar collector which is relatively simple in design, easy to use, requires a minimum of space, servicing and maintenance, and effectively collects the solar radiation impinging thereat.

Now in order to implement these and still further objects of the invention, which will become more readily apparent as the description proceeds, the reflector is approximately semicylindrical in shape and is collapsible by means of overlapping plates. Further, the liquid-containing elements comprise a collector pipe enclosed by a protective tube and having attached thereto in the longitudinal direction radial elements, and the liquid-containing elements are mounted to be axially rotatable.

Due to the aforementioned construction of the solar collector of the present invention there are combined the advantages of an approximately semicylindrical configured reflector and those of a flat collector for absorbing diffuse radiation. The arrangement of radial elements which are fixed in the longitudinal direction to the collector pipe itself, particularly allows utilization of diffuse solar radiation, thus obtaining an appreciably greater efficiency.

It is of advantage if the collector pipe is located at the focus or focal point of the reflector for capturing direct solar irradiation and the radial elements are located outside of the focal point in order to make use of diffuse radiation. Also, the collector pipe and the radial elements beneficially terminate in a common supply and discharge line and a thermocouple is located in the discharge line or conduit.

By locating the collector pipe at the focal point of the reflector it is possible, when the reflector is fully extended, to utilize the maximum solar radiation for the collector pipe and at the same time to use diffuse solar radiation in order to heat the liquid in the radial elements, since these are located outside the focal point or focus of the reflector. With the reflector in its collapsed position, the collector pipe together with the radial elements are rotated through 90°. Diffuse solar radiation then can continue to act upon the radial elements, or part of the solar radiation is transmitted from the collapsed reflector surface to the radial elements. Both the collector pipe and the radial elements terminate in the common supply and discharge line. The discharge line from both parts of the collector, i.e., the collector pipe and the radial elements, advantageously incorporates a common thermocouple functioning in such a manner that when the collector pipe is more intensely heated, the heated liquid mainly circulates through the collector pipe, whereas when the radial elements are heated by diffuse radiation the thermocouple is controlled such that the heated liquid is principally drawn from the radial elements. The thermocouple is furthermore controlled in such a manner that part of the liquid can always be drawn from both components, i.e. from the collector pipe and the radial elements, thereby avoiding overheating or bubble formation in the other component.

According to another preferred manifestation of the invention, the liquid-containing parts of the individual solar collectors are joined together by means of flexible connections.

Joining the individual collectors by means of flexible connections is associated with the advantage that the individual solar collectors are able to move easily within a sunblind assembly, and leaks can be avoided in the pipes connecting the individual solar collectors.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
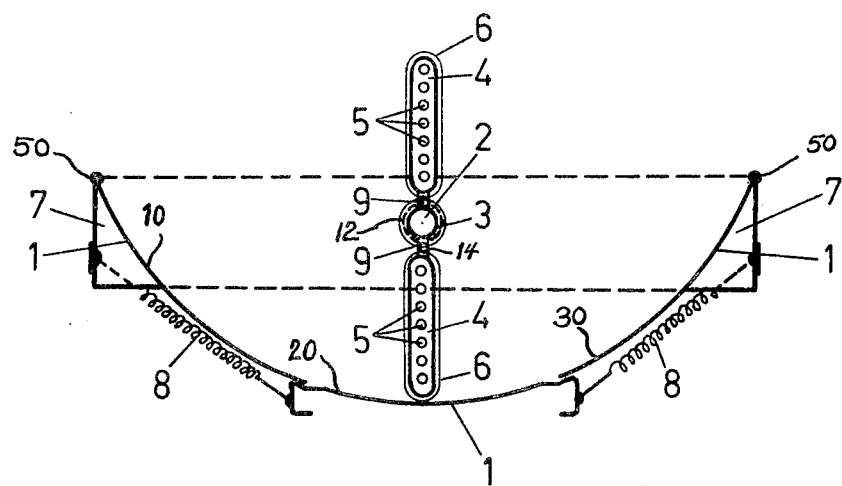
FIG. 1 is a cross-sectional view through a solar collector of the invention depicted in its extended position.
Figure 2:
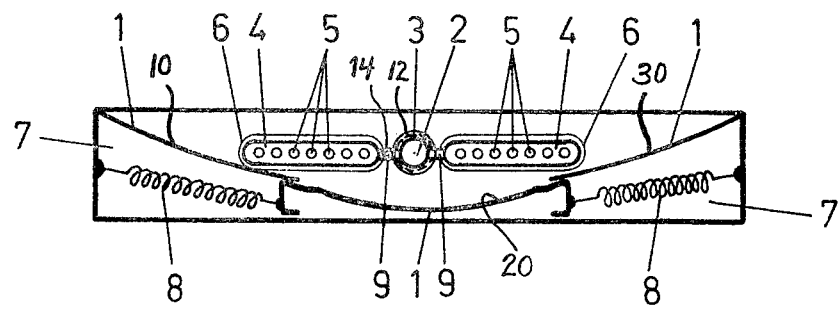
FIG. 2 illustrates a cross-sectional view through the solar collector of FIG. 1 in its collapsed position.

Describing now the drawings, in FIG. 1 there is shown an exemplary embodiment of solar collector as contemplated by the invention which comprises a support 7 which carries a reflector 1 composed of a number of parts 10, 20, and 30 which are configured such that they can be conveniently slid one into the other, whereby the reflector 1 may either assume an extended position having a substantially semicylindrical configuration, as shown in FIG. 1, or a collapsed position as shown in FIG. 2. At the mid-point of the approximately semicylindrical reflector 1, there is arranged a collector pipe or conduit 2 which is here shown enclosed by a protective tube 3 which is preferably formed of a transparent material, for example, glass or plastic. Attached to the collector pipe 2 in the longitudinal or lengthwise direction thereof, are the radial elements 4 incorporating a number of channels 5 for a liquid. As a matter of convenience in illustration there have only been shown in FIGS. 1 and 2 two such radial elements 4, others of which may be assumed to be located in tandem forwardly and behind the visible radial elements 4 of the drawings. These radial elements 4 equally can be surrounded by a transparent protective layer 6, again formed for instance of glass or plastic. At both sides of the reflector 1 the collector pipe 2 together with its radial elements 4 is rotatably mounted in the support 7, for instance by means of the bearings or equivalent structure, generally indicated by reference character 12. The middle or intermediate portion 20 of the collapsible reflector 1 is fixed to the support 7 by means of springs 8 or other appropriate resilient elements. The outer portions 10 and 30 may be hingedly or otherwise suitably connected at locations 50 with the support 7. The liquid channels 5 of the radial elements 4 are connected to the collector pipe 2 by way of supply and discharge ducts or lines 9, and a thermocouple is incorporated in the supply and discharge ducts 9, which thermocouple has been simply indicated by reference characters 14 for the lower duct or line 9 of the showing of FIG. 1.

Now with the reflector 1 in the collapsed position as shown in FIG. 2, the two outer sections or parts 10 and 30 of the reflector 1 overlap the middle or intermediate section 20, and at the same time the collector pipe 2 together with its radial elements 4 is rotated through an angle of about 90° such that it assumes an essentially horizontal position. In this condition the collector pipe 2 is no longer disposed at the focus or focal point of the reflector 1, yet diffuse solar irradiation can still act on the radial elements 4 via the outer sections 10, 30 of the reflector 1 and heat the fluid contained in the liquid channels 5.

For the sake of simplicity, all parts not essential to an understanding of the invention have been conveniently omitted, such as the flexible connections between the individual solar collectors and the rotatable suspension of the support 7 within a sunblind assembly.

The invention as described in the foregoing is clearly not restricted to what has been shown by way of example in the drawings. For instance, the side sections of the reflector 1, for example, can be further extended upwards and provided with an additional hinged joint, in which case these "wings" can be folded downwards in the collapsed position of the unit. In this way it would be possible to achieve a more concentrated focusing of diffuse radiation on the collector pipe in the event of relatively weak solar radiation.

While there are shown and described present preferred embodiments of the invention, it is to be distinctly understood that the invention is not limited thereto, but may be otherwise variously embodied and practiced within the scope of the following claims. Accordingly,

What I claim is:

1. A solar collector comprising:
    a reflector containing overlapping plates;
    support means for supporting said reflector;
    means for enabling said overlapping plates of said reflector to be movable between a first extended position and a collapsed position, said reflector possessing an approximately semicylindrical shape when said plates assume their extended position;
    liquid-containing elements cooperating with said reflector;
    said liquid-containing elements comprising:
    a collector pipe enclosed by a protective tube; and
    radial elements carried by and extending in the longitudinal direction of the collector pipe;
    means mounting said collector pipe and said radial elements to be rotatable.

2. The solar collector as defined in claim 1, wherein:
    said reflector has a focal point;
    said collector pipe being located at the region of the focal point of the reflector when said plates are in their extended position in order to directly receive the solar radiation;
    said radial elements being located externally of the focal point when said plates are in their collapsed position in order to receive diffuse solar radiation.

3. The solar collector as defined in claim 1, further including:
    common supply and discharge conduit means at which terminate said collector pipe and said radial elements; and
    thermocouple means located in said conduit means.

4. The solar collector as defined in claim 3, wherein:
    said liquid-containing elements of individual solar collectors are capable of being joined together by means of flexible connections.

5. A solar collector comprising:
    reflector means comprising a plurality of at least partially overlapping plates;
    support means for supporting said reflector means;
    means mounting said overlapping plates of said reflector means to be movable between a first extended position and a collapsed position, said reflector means possessing an approximately semicylindrical shape when said plates assume their extended position;
    liquid-conducting elements cooperating with said reflector means;
    said liquid-conducting elements comprising:
    a collector pipe: and
    a plurality of radial elements supported by said collector pipe: and
    means rotatably mounting said collector pipe and said radial elements.

* * * * *